(12) United States Patent
Chung et al.

(10) Patent No.: US 7,678,359 B2
(45) Date of Patent: Mar. 16, 2010

(54) PREPARATION METHOD OF WHITE LIGHT QUANTUM DOT

(75) Inventors: Shu-Ru Chung, Taichung County (TW); Kuan-Wen Wang, Taipei (TW); Li-Kuei Lin, Hsinchu (JP); Chen-Yu Huang, Chiayi County (TW); Chih-Cheng Chiang, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 124 days.

(21) Appl. No.: 12/022,020

(22) Filed: Jan. 29, 2008

(65) Prior Publication Data

US 2009/0092539 A1 Apr. 9, 2009

(30) Foreign Application Priority Data

Oct. 5, 2007 (TW) .............................. 96137425 A

(51) Int. Cl.
*C01B 17/00* (2006.01)
*C01B 19/00* (2006.01)

(52) U.S. Cl. ...................... 423/508; 423/511; 977/774; 252/62.3 ZT; 252/62.3 V

(58) Field of Classification Search ................ 423/508, 423/511; 977/774; 252/62.3 ZT, 62.3 V
See application file for complete search history.

(56) References Cited

U.S. PATENT DOCUMENTS 6,379,585 B1 * 4/2002 Vecht et al. ............ 252/301.35

OTHER PUBLICATIONS

Laura A. Swafford et al, "Homogeneously Alloyed $CdS_xSe_{1-x}$ Nanocrystals: Synthesis, Characterization, and Composition/Size-Dependent Band Gap", JACS Articles, J. Am. Chem. Soc. 2006, Aug. 29, 2006, pp. 12299-12306, US.
Xinhua Zhong et al, "Composition-Tunable $Zn_xCd_{1-x}Se$ Nanocrystals with High Luminescence and Stability", JACS Articles, J. Am. Chem. Soc. 2003, Jun. 21, 2003, pp. 8589-8594, US.
Xinhua Zhong et al, "Alloyed $Zn_xCd_{1-x}S$ Nanocrystals with High Narrow Luminescence Spectral Width", JACS Articles, J. Am. Chem. Soc. 2003, Oct. 9, 2003, pp. 13559-13563, US.

* cited by examiner

*Primary Examiner*—Timothy C Vanoy
(74) *Attorney, Agent, or Firm*—Quintero Law Office

(57) ABSTRACT

The invention provides a preparation method of $Zn_{1-x}Cd_xA$ quantum dot capable of emitting white light, in which A is S or $S_{1-y}Se_y$; $0<x<1$ and $0<y<1$. The method includes preparing a sulfur-containing organic solution; mixing a zinc-containing precursor and a cadmium-containing precursor with an organic acid, and dissolving them in a co-solvent to obtain a homogeneous solution; and mixing sulfur-containing organic solution with the homogeneous solution to produce $Zn_{1-x}Cd_xA$ quantum dot.

19 Claims, 17 Drawing Sheets

PREPARATION METHOD OF WHITE LIGHT QUANTUM DOT

BACKGROUND OF THE INVENTION

1. Field of the Invention

The invention relates to a preparation method of a quantum dot, and more particularly to a preparation method of a quantum dot capable of emitting white light.

2. Description of the Related Art

Currently, preparation method of phosphor includes sintering, sol-gel and micro-wave hyperthermia etc. For sintering, diffusional reaction between oxides is accelerated by a hyperthermal temperature (>1000° C.) to prepare phosphor. Diffusional reaction between oxides, however, is slow and requires a long time. For sol-gel, a precursor is formed at a low temperature and a solid state diffusional reaction is then executed by heating the precursor up to a hyperthermal temperature to produce phosphor. Thus, requiring an additional step along with the hyperthermal temperature for preparation. For micro-wave hyperthermia, the solid diffusional reaction is executed by micro-wave with a character of rapid local heat, as a heat source. By the above methods, however, only phosphor with monochromatic light is prepared.

For traditional phosphor, since lattice field effect is different from expansion of electron cloud, adding various active elements to modify its photoluminescence wavelength is required. Moreover, because luminous mechanism of phosphor belongs to energy transfer between molecular orbitals (the unlike orbitals like f-d or the like orbitals like f-f), phosphor is excited only by light with a certain wavelength and energy loss is large.

Typically, phosphor is mainly utilized in colorization, namely luminous. Phosphor is widely applied in light-emitting diodes (LED) with character of energy conservation, for instance. As petroleum and other energy sources from natural resources dissipate, popularity of energy conservation by using LED products is gaining momentum, especially white light LEDs (WLED).

At present, fabrication of WLED mainly includes two methods. The first method utilizes a plurality of LED chips, namely, red, green and blue LED chips are packaged together, and white light can be obtained by mixing the individual lights. The second method, generally, is called a single LED chip. Various prearranged phosphors are excited by a single LED chip, and the white light can be obtained by mixing the light of chip and phosphors. For example, yellow phosphor such as yttrium aluminum garnet (YAG) can be excited by a single blue LED chip to produce yellow light, then, the yellow light can be mixed with blue light emitted by the blue LED chip to produce white light. Similarly, the prearranged blue, green and red phosphors can be excited by an LED chip capable of emitting ultraviolet light to mix with and produce white light.

Meanwhile, for an ultraviolet LED chip type, in order to achieve white light, mixing of red, green and blue phosphors is required and fabrication and design of the WLED is complicated because luminous efficiency and decay rate of phosphors are different.

Since conventional phosphors are monochromatic light, in order to obtain white light, mixing two or more phosphors is required so that costs and fabrication difficulty of WLEDs are increased.

Thus, a material capable of emitting white light is desired to reduce fabrication costs and eliminate the previously described shortcoming.

BRIEF SUMMARY OF INVENTION

Accordingly, the invention provides a preparation method of $Zn_{1-x}Cd_xA$ quantum dot capable of emitting white light, in which A is S or $S_{1-y}Se_y$; $0<x<1$ and $0<y<1$. An exemplary preparation method of $Zn_{1-x}Cd_xS$ quantum dot includes: preparing a sulfur-containing organic solution; mixing a cadmium precursor with a zinc precursor to obtain a complex compound and dissolving the complex compound in a co-solvent to prepare a homogeneous solution; and mixing the sulfur-containing organic solution with the homogenous solution to produce $Zn_{1-x}Cd_xS$ quantum dot. Since the preparation method is one synthetic step, the preparation steps are simplified and costs are reduced. Moreover, the surface of $Zn_{1-x}Cd_xS$ quantum dot is bonded to an organic molecule thereby being wrapped up and protested from oxidation and is easily dissolved in an organic solvent.

Furthermore, $Zn_{1-x}Cd_xS$ quantum dot has a diameter less than 10 nm, preferably 5 nm, and a single crystal formation. Thus, it is a nanocrystal. Since the nanocrystal is in nanoscaling dimensions, quantum confinement effect will occur. Thus, recombination efficiency to carrier in quantum dot can be increased and luminous efficiency is also improved. While $Zn_{1-x}Cd_xS$ quantum dot is excited by light with a wavelength of less than 450 nm, it can emit white light with a photoluminescence spectrum from 400 nm to 800 nm.

An exemplary preparation method of $Zn_{1-x}Cd_xS_{1-y}Se_y$ quantum dot includes: mixing the sulfur-containing organic solution with a selenium-containing organic solution to obtain a sulfur- and selenium-containing organic solution; and mixing the sulfur- and selenium-containing organic solution with the homogeneous solution to react and produce $Zn_{1-x}Cd_xS_{1-y}Se_y$ quantum dot. While $Zn_{1-x}Cd_xS_{1-y}Se_y$ quantum dot is excited by light with a wavelength of less than 450 nm (like UV light), it can emit white light with a photoluminescence spectrum from 400 nm to 700 nm.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
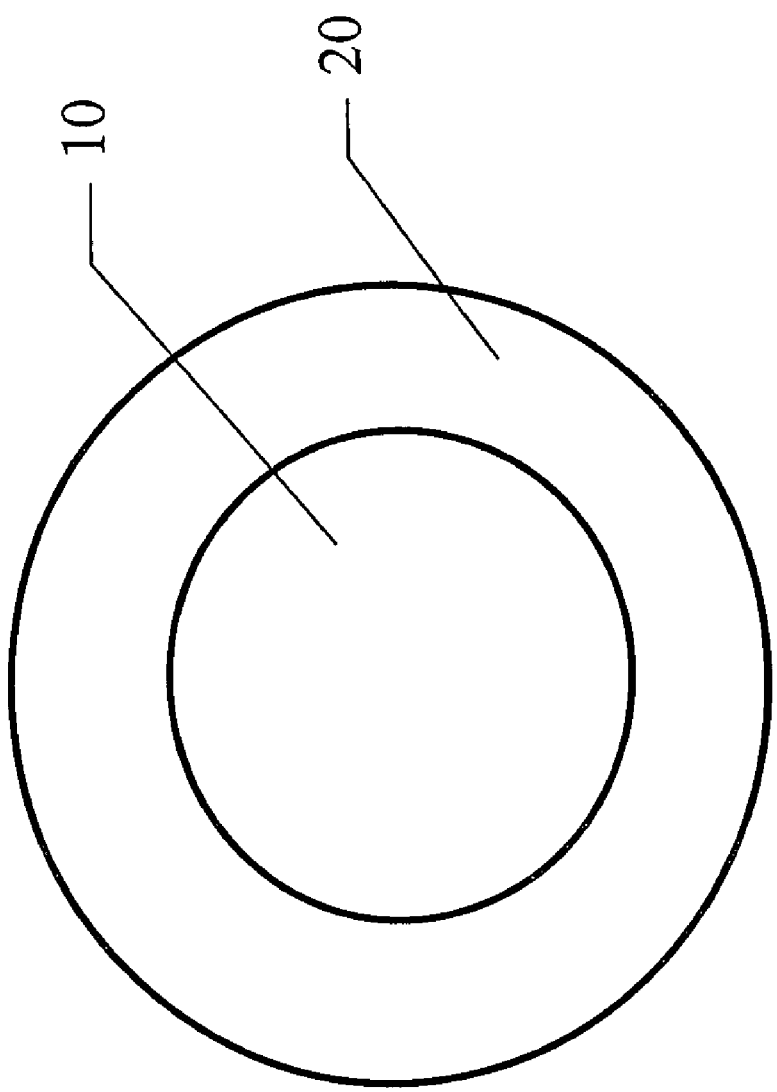
FIG. 1 is a schematic view of formation $Zn_{1-x}Cd_xS$ quantum dot wrapped by an organic molecule.

The following description is of the exemplary embodiments for carrying out the invention. This description is made for the purpose of illustrating the general principles of the invention and should not be taken in a limiting sense. The scope of the invention is best determined by reference to the appended claims.

Example 1

$Zn_{0.8}Cd_{0.2}S$ Quantum Dot $Zn_{0.8}Cd_{0.2}S$ Preparation

At first, 0.0481 g sulfur powder was placed in a vacuum environment to remove moisture, then, inert gas such as argon (Ar) was injected into the vacuum environment to prevent oxidation or humidification. 4 ml organic solvent such as octadecene was added, then, the mixture was heated up to a temperature of between about 40° C. and 80° C. along with an ultrasonic shocking treatment for 20 minutes to 40 minutes to obtain a sulfur-containing organic solution (A solution), for example colorless sulfur-containing octadecene. Preferably, the ultrasonic shocking treatment was at 80° C. for 30 minutes.

Note that octadecene can also be replaced by aliphatic phosphines such as tri-n-octylphosphine (TOP) or tri-n-butylphosphine (TBP), or amines such as dioctylamine (DOA). Accordingly, the sulfur-containing organic solution may be sulfur-containing tri-n-octylphosphine solution, sulfur-containing tri-n-butylphosphine solution or sulfur-containing dioctylamine solution.

0.0194 g zinc-containing precursor such as zinc oxide (ZnO) powder and 0.0077 g cadmium-containing precursor such as cadmium oxide (CdO) powder were put into a three-necked bottle, and heated up to a temperature of about 120° C. at an environment full of argon (Ar) for 20 minutes to remove moisture, then, cooled to room temperature. After cooling, 0.6828 g organic acid such as stearic acid (SA) was added and heated up to a temperature of about 250° C. to form a complex compound. After cooling the complex compound, 5.82 g hexadecylamine (HAD) and 5.82 g tri-n-octylphosphine oxide (TOPO) were added into the three-necked bottle and stirred for 5 minutes. After stirring, the mixture was heated up to a temperature of about 320° C. to obtain a clear, homogeneous solution (B solution).

The zinc-containing precursor may be zinc acetate ($Zn(CH_3COO)_2$), zinc stearate ($Zn(C_{18}H_{35}COO)_2$) or diethyl zinc ($Zn(C_2H_5)_2$), and cadmium acetate ($Cd(CH_3COO)_2$) or dimethyl cadmium $Cd(CH_3)_2$) may act as a cadmium-containing precursor as well.

Moreover, stearic acid can serve as a complex agent, and may be replaced by any other suitable organic acids, for example lauric acid or oleic acid. Additionally, both hexadecylamine and tri-n-octylphosphine oxide may be named as a co-solvent and be replaced by any other suitable amines such as dodecylamine (DDA), in hexadecylamine.

When a homogeneous solution (B solution) had been obtained at 320° C. the sulfur-containing organic solution (A solution) was added into the three-necked bottle and then allowed to react at a temperature of between about 285° C. and 295° C. for 1 second to 120 minutes to produce a nanocrystal of $Zn_{0.8}Cd_{0.2}S$ quantum dot.

Note that before A solution was added, heating B solution up to 320° C. was to avoid extremely decreasing the reaction temperature of the mixture (A and B solutions) when adding A solution with a temperature less than B solution. Thus, B solution can be heated up to a temperature greater than or less than 320° C. before mixing. Furthermore, the reaction temperature after mixing was preferably maintained at about 290° C. for about 60 minutes.

FIG. 1 is a schematic view illustrating a formation of nanocrystal and organic molecule according to embodiments of the invention. Referring to FIG. 1, it was found that $Zn_{0.8}Cd_{0.2}S$ quantum dot 10 was wrapped up by an organic molecule 20 such as TOPO to prevent the $Zn_{0.8}Cd_{0.2}S$ quantum dot 10 from oxidation and be easily dissolved in the organic solvent. Moreover, the organic molecule 20 was formed on the surface of the quantum dot 10 by chemical bonding.

$Zn_{0.8}Cd_{0.2}S$ quantum dot had a diameter less than 10 nm, preferably 5 nm. Moreover, since $Zn_{0.8}Cd_{0.2}S$ quantum dot is in nano-scaling dimensions, quantum confinement effect will occur. Thus, recombination efficiency of carrier in the quantum dot is increased, thereby improving luminous efficiency.

After preparing, $Zn_{0.8}Cd_{0.2}S$ quantum dot was purified by pure methanol and dissolved in n-hexane solution for subsequent identification.

$Zn_{0.8}Cd_{0.2}S$ Identification

Figure 2:
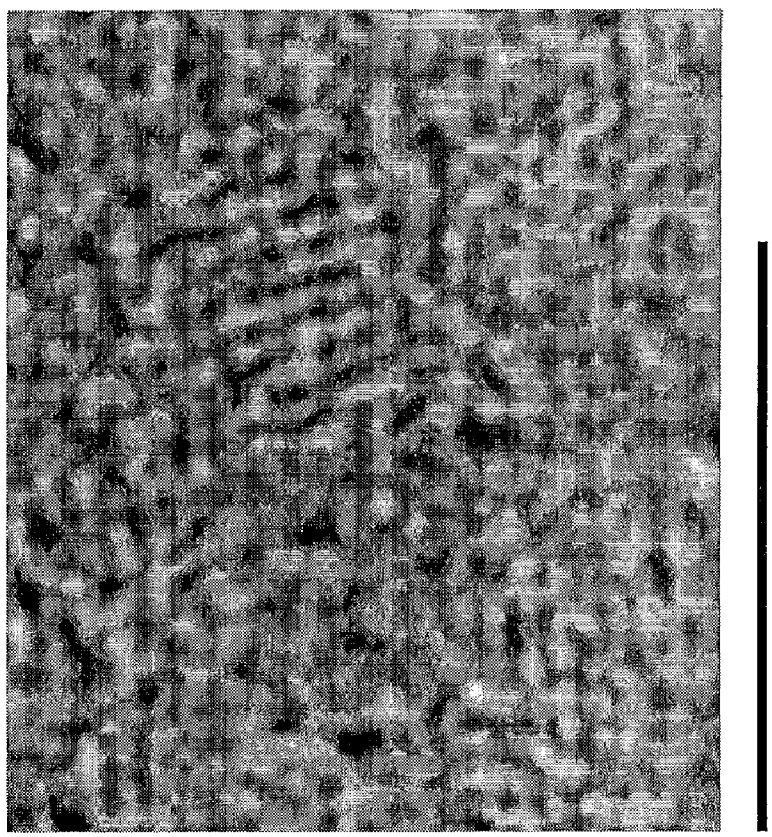
FIG. 2 is a transmission electron microcopy (TEM) picture of $Zn_{0.8}Cd_{0.2}S$ quantum dot of example 1.

The product sample was identified by transmission electron microcopy (TEM), energy dispersive spectrometer (EDS), X-ray diffraction meter (XRD) and photoluminescence (PL) spectrum. The result was disclosed as following:

FIG. 2 is a TEM picture of the product sample. Referring to FIG. 2, the product sample, $Zn_{0.8}Cd_{0.2}S$ quantum dot, had a diameter of less than 5 nm and diameter distribution was uniform. Moreover, $Zn_{0.8}Cd_{0.2}S$ quantum dot can also be called a nanocrystal because of nano-scaling dimensions and a single crystal formation as shown in FIG. 2.

Figure 3:
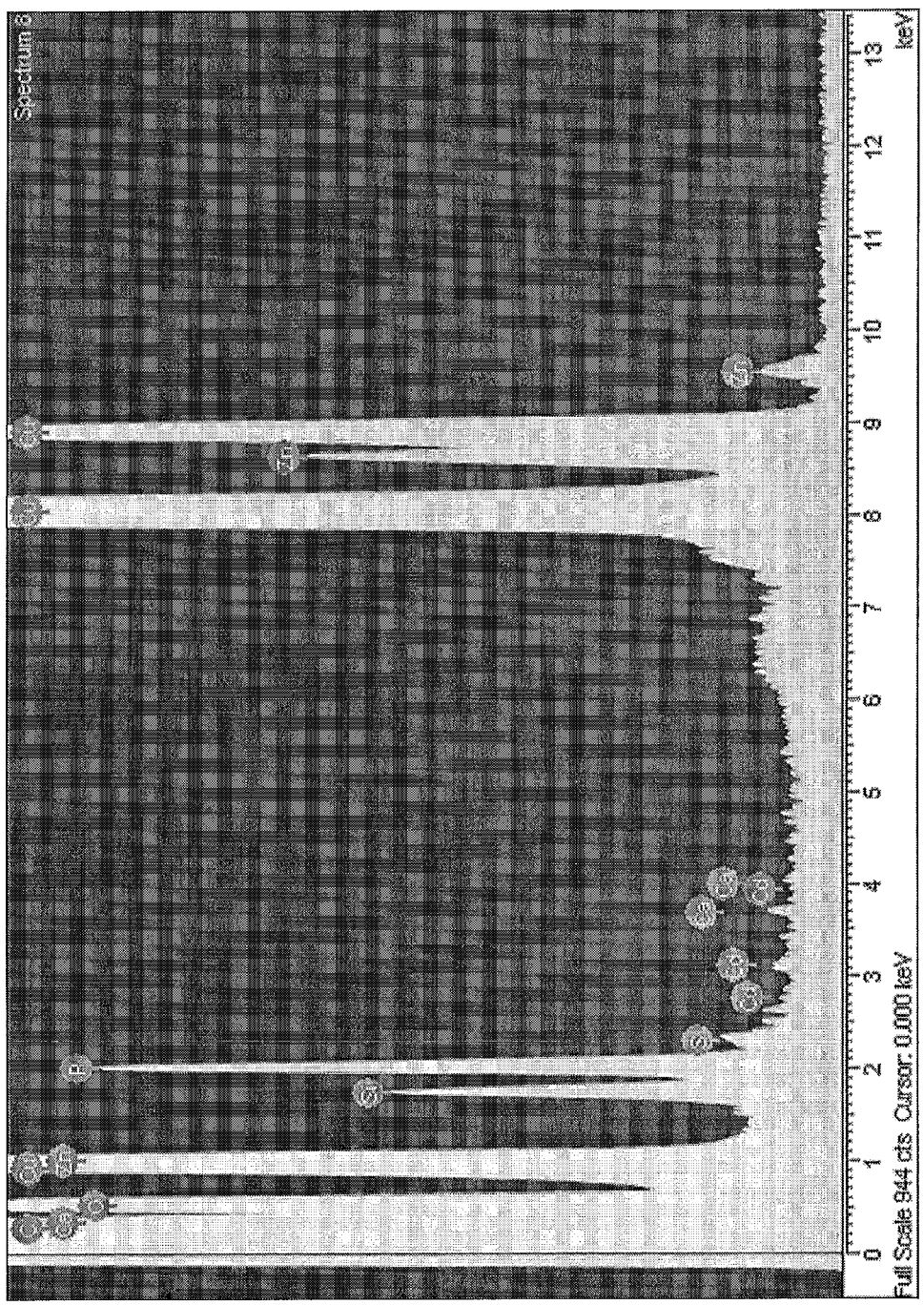
FIG. 3 is an energy dispersive spectrometer (EDS) of $Zn_{0.8}Cd_{0.2}S$ quantum dot of example 1.

FIG. 3 is an EDS of the product sample. After analysis, the EDS depicted that the product sample not only comprises Zn, Cd, and S elements, but also strong signal of P element. According to FIGS. 2 and 3, the product sample may be a ternary compound comprising Zn, Cd and S elements, and wrapped by tri-n-octylphosphine oxide (TOPO). Moreover, because signals of Cu and C elements as shown in FIG. 3, are components of copper grid clad in carbon during EDS's analysis, no further discussion is provided herein.

Figure 4:
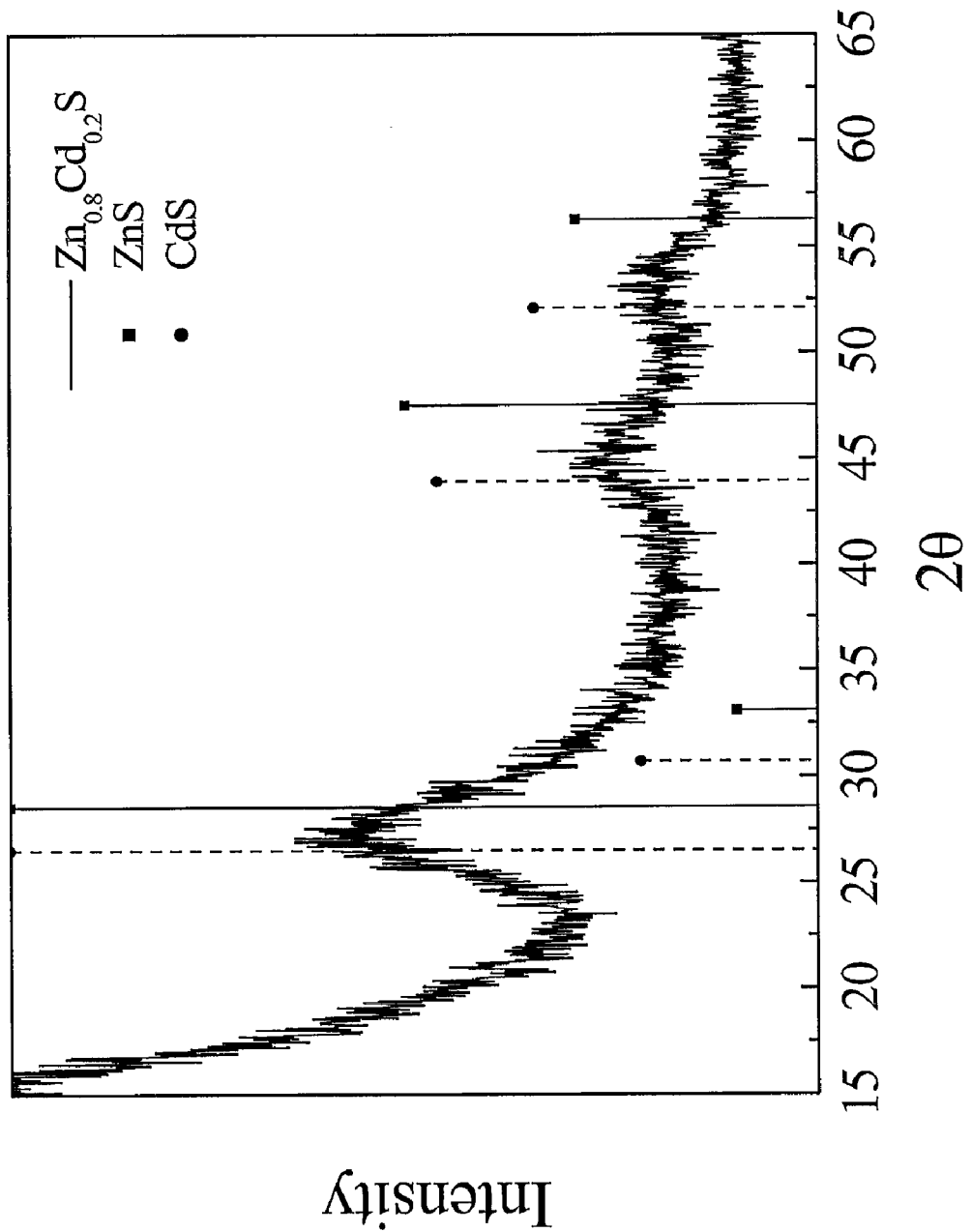
FIG. 4 is a X-ray diffraction meter (XRD) analysis of $Zn_{0.8}Cd_{0.2}S$ quantum dot of example 1.

FIG. 4 is an XRD of the product sample. This XRD shows a distraction peak between that of pure ZnS and CdS. Accordingly, formation of the product sample may be an alloy between ZnS and CdS.

Figure 5:
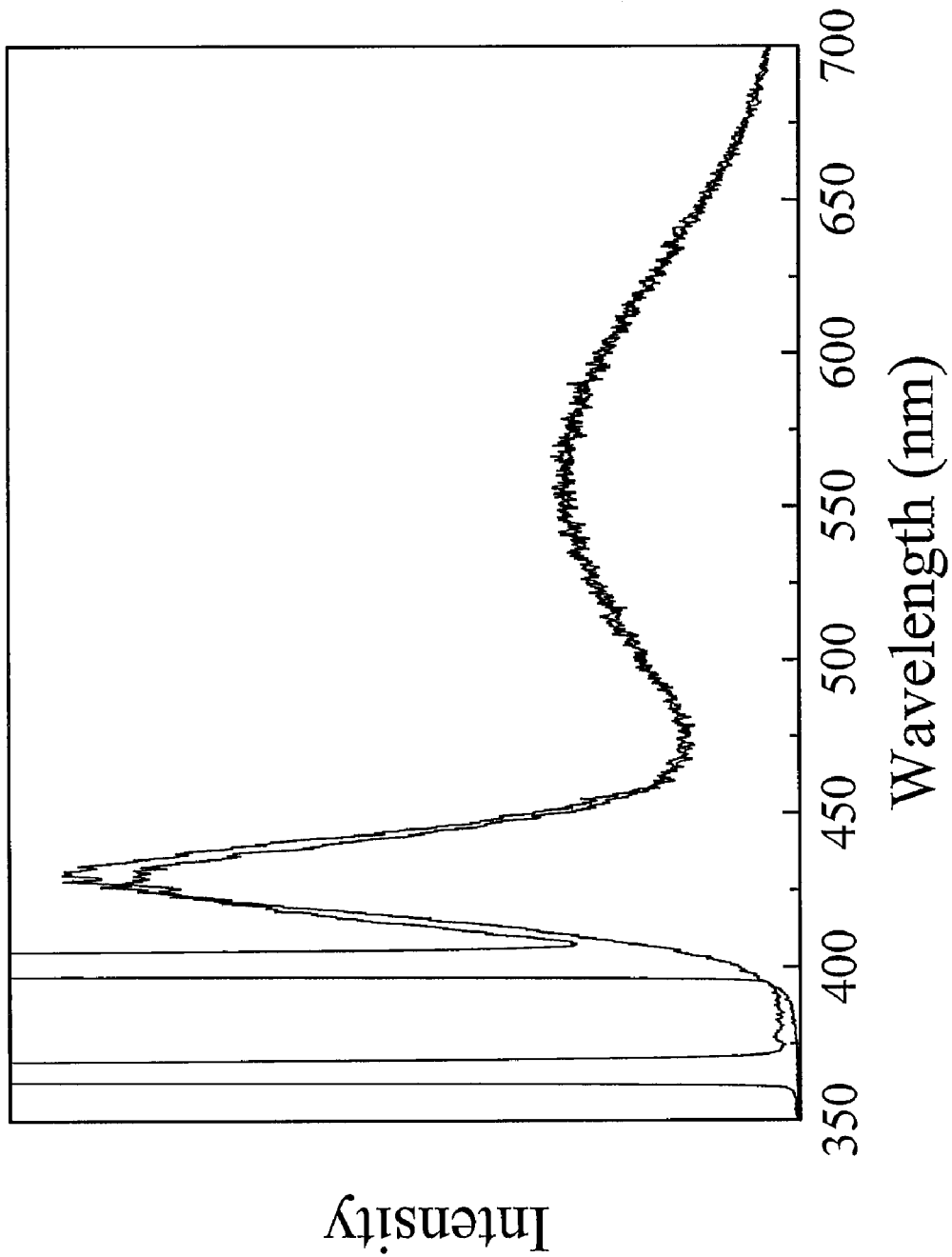
FIG. 5 is a photoluminescence (PL) spectrum of $Zn_{0.8}Cd_{0.2}S$ of example 1.

FIG. 5 is a photoluminescence spectrum of the product sample exited by light with wavelengths of 365 nm and 400 nm. FIG. 5 shows that the product sample, having a photoluminescence spectrum from 400 nm to 750 nm, is white light. Accordingly, the product sample, $Zn_{0.8}Cd_{0.2}S$ quantum dot, prepared by the method in example 1, can emit white light while it is exited by light with wavelengths of 365 nm or 400 nm. Moreover, the organic molecule is bonded to the surface of $Zn_{0.8}Cd_{0.2}S$ quantum dot and wraps around it for protection.

Figure 6:
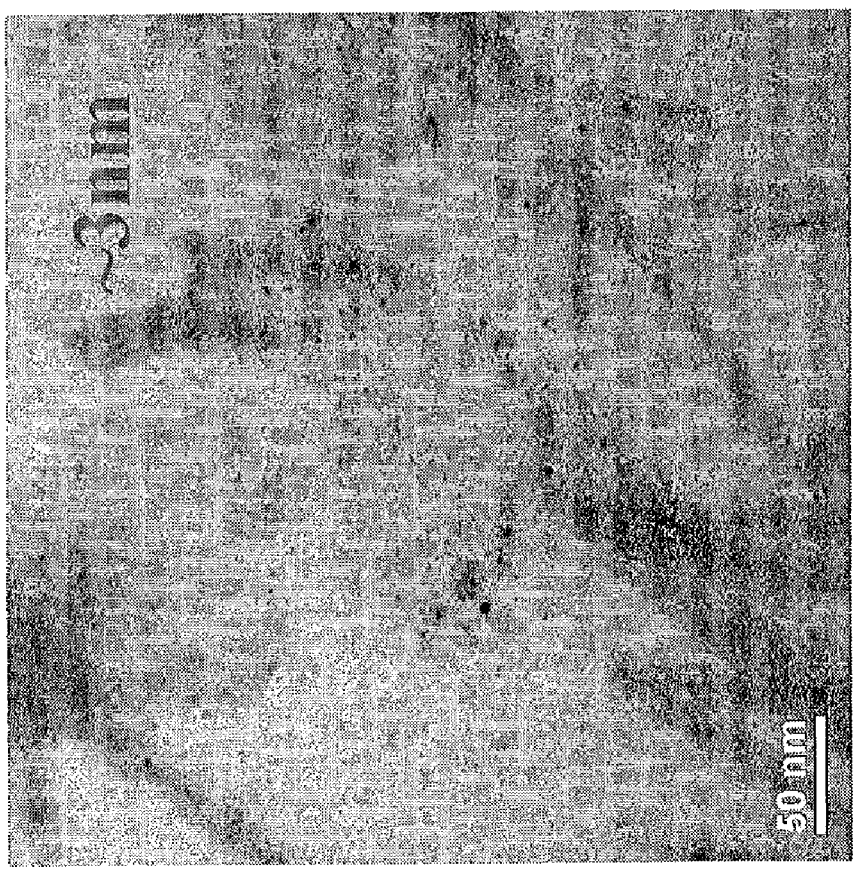
FIG. 6 is a TEM picture of $Zn_{0.8}Cd_{0.2}S$ quantum dot prepared by dodecylamine (DDA)

FIG. 6 is a TEM picture of $Z_{0.8}Cd_{0.2}S$ quantum dot which was prepared by a method, using dodecylamine (DDA) as the co-solvent to replace hexadecylamine (HAD). FIG. 6 shows that the product sample has a diameter less than 3 nm and a uniform diameter distribution.

Figure 7:
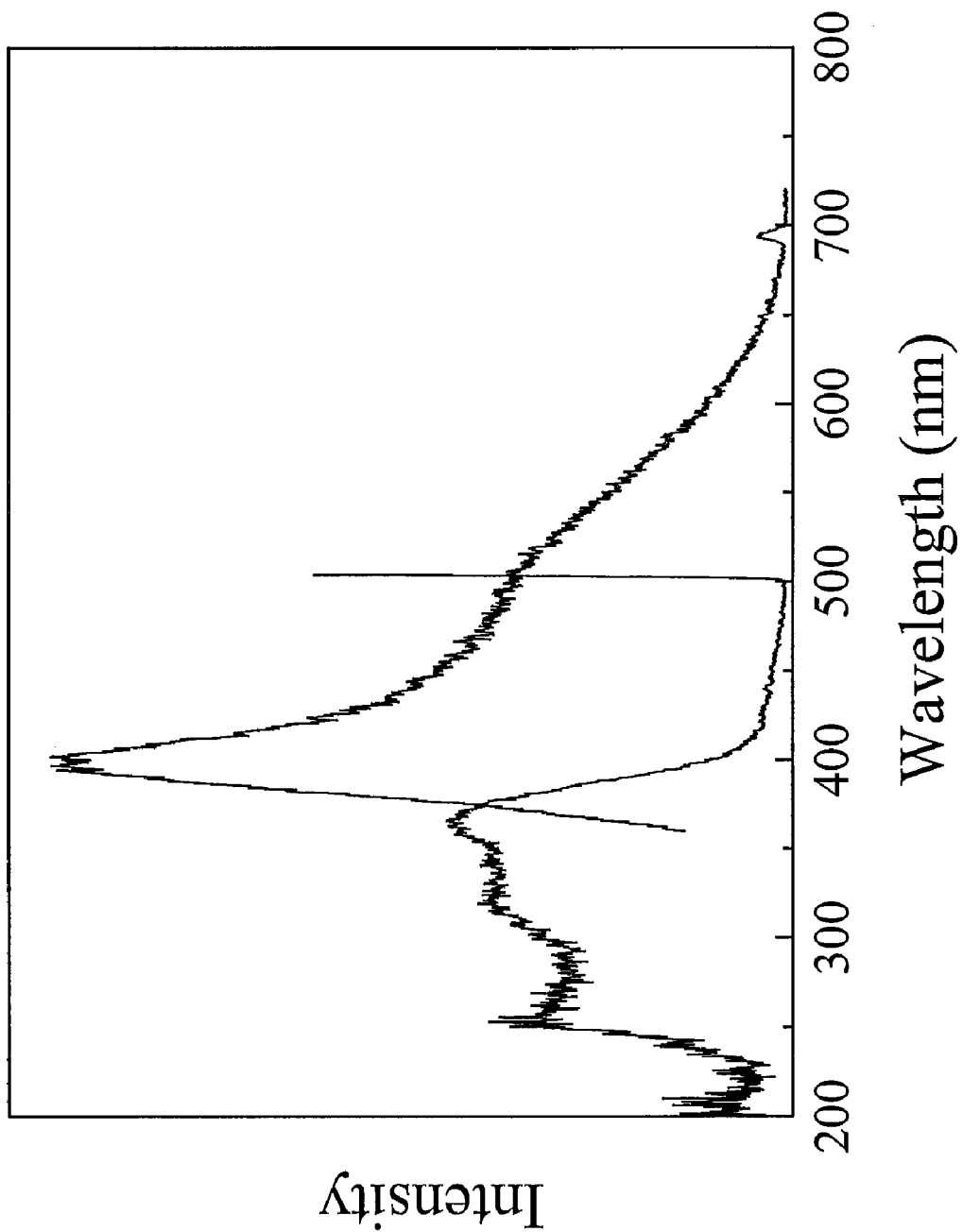
FIG. 7 is a photoluminescence spectrum of $Zn_{0.8}Cd_{0.2}S$ quantum dot prepared by DDA.

FIG. 7 is a PL spectrum of the product sample prepared by dodecylamine as the co-solvent. Referring to FIG. 7, the product sample can emit white light with a photoluminescence spectrum from 400 nm to 750 nm.

Example 2

$Zn_{0.5}Cd_{0.5}S$ Quantum Dot $Zn_{0.5}Cd_{0.5}S$ Preparation 0.0481 g sulfur powder was put in a vacuum environment to remove moisture. 4 ml organic solvent such as octadecene was added in the vacuum environment or atmosphere full of inert gas to obtain a sulfur-containing organic solution (A solution), for example sulfur-containing octadecene. The preparation method of the sulfur-containing organic solution is similar to that in Example 1, thus, the repeated description will not be provided here.

Next, a homogeneous solution (B solution) was prepared. In example 2, the preparation steps for the homogeneous solution are substantially similar to that in Example 1, thus, part of the preparation steps are omitted for brevity.

0.0122 g ZnO and 0.0193 g CdO were put into a three-necked bottle, heated up to 120° C. for about 20 minutes in an atmosphere full of Ar to remove moisture and cooled to room temperature. 0.6828 g stearic acid (SA) was added and heated up to 230° C. to obtain a complex compound. After the complex compound was produced, the temperature was cooled down. 5.82 g hexadecylamine (HAD) and 5.82 g tri-n-octylphosphine oxide (TOPO) were added into the three-necked bottle, stirred for about 5 minutes and then heated up to 320° C. to prepared the clear, homogeneous solution (B solution).

Similar to example 1, the sulfur-containing solution (A solution) was added into the three-necked bottle and reacted with the homogeneous solution (B solution) at a temperature of about 290° C. for about 1 minute to prepare $Zn_{0.5}Cd_{0.5}S$ quantum dot. Note that this product sample, $Zn_{0.5}Cd_{0.5}S$ quantum dot, is wrapped by an organic molecule to prevent it from oxidation and has a diameter less than 5 nm.

It is appreciated that the reactant utilized in example 2 may also be replaced by the chemical provided in example 1.

$Zn_{0.5}Cd_{0.5}S$ Identification

Figure 8:
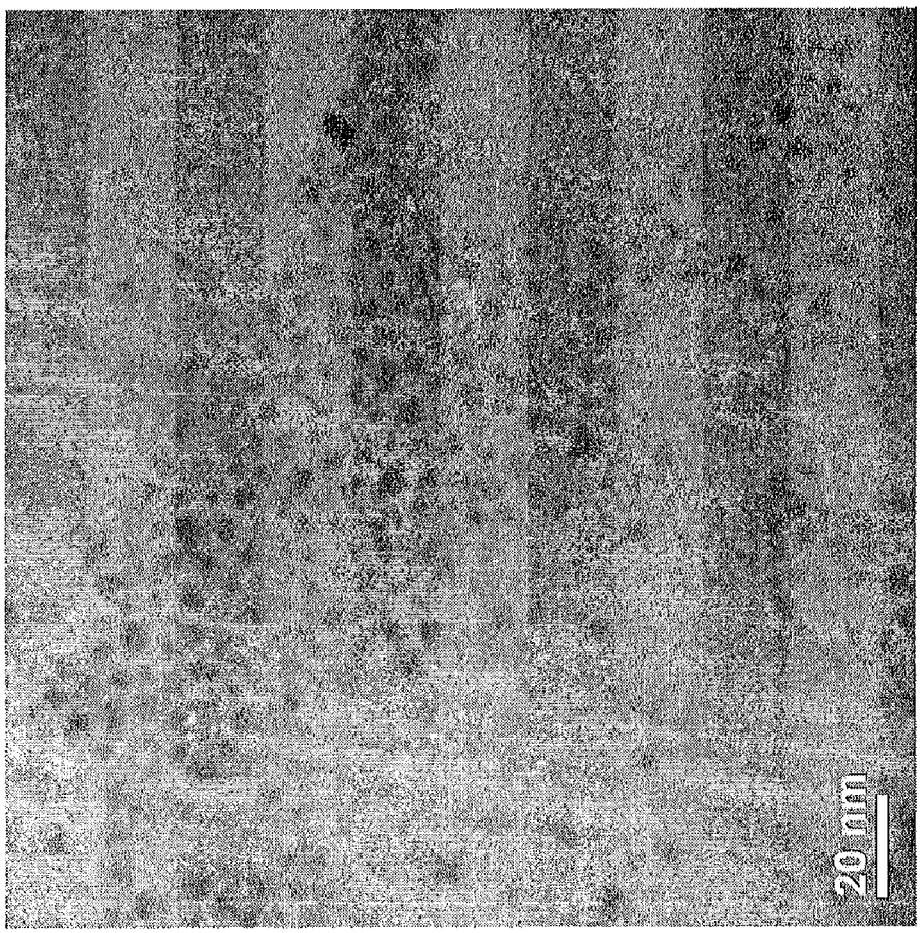
FIG. 8 is a TEM picture of $Zn_{0.5}Cd_{0.5}S$ quantum dot of example 2.

After preparation, the product sample was identified by transmission electron microcopy (TEM), X-ray diffraction meter (XRD) and photoluminescence (PL) spectrum. The result was disclosed as following:

FIG. 8 is a TEM picture of the product sample. This TEM picture shows that the product sample, $Zn_{0.5}Cd_{0.5}S$ quantum dot, had a diameter less than 5 nm and uniform distribution. Moreover, the product sample was a single crystal structure, as shown in the TEM picture. Since the product sample is in nano-scaling dimensions, quantum confinement effect will occur. Thus, the product sample in example 2 has a relatively high luminous efficiency.

Figure 9:
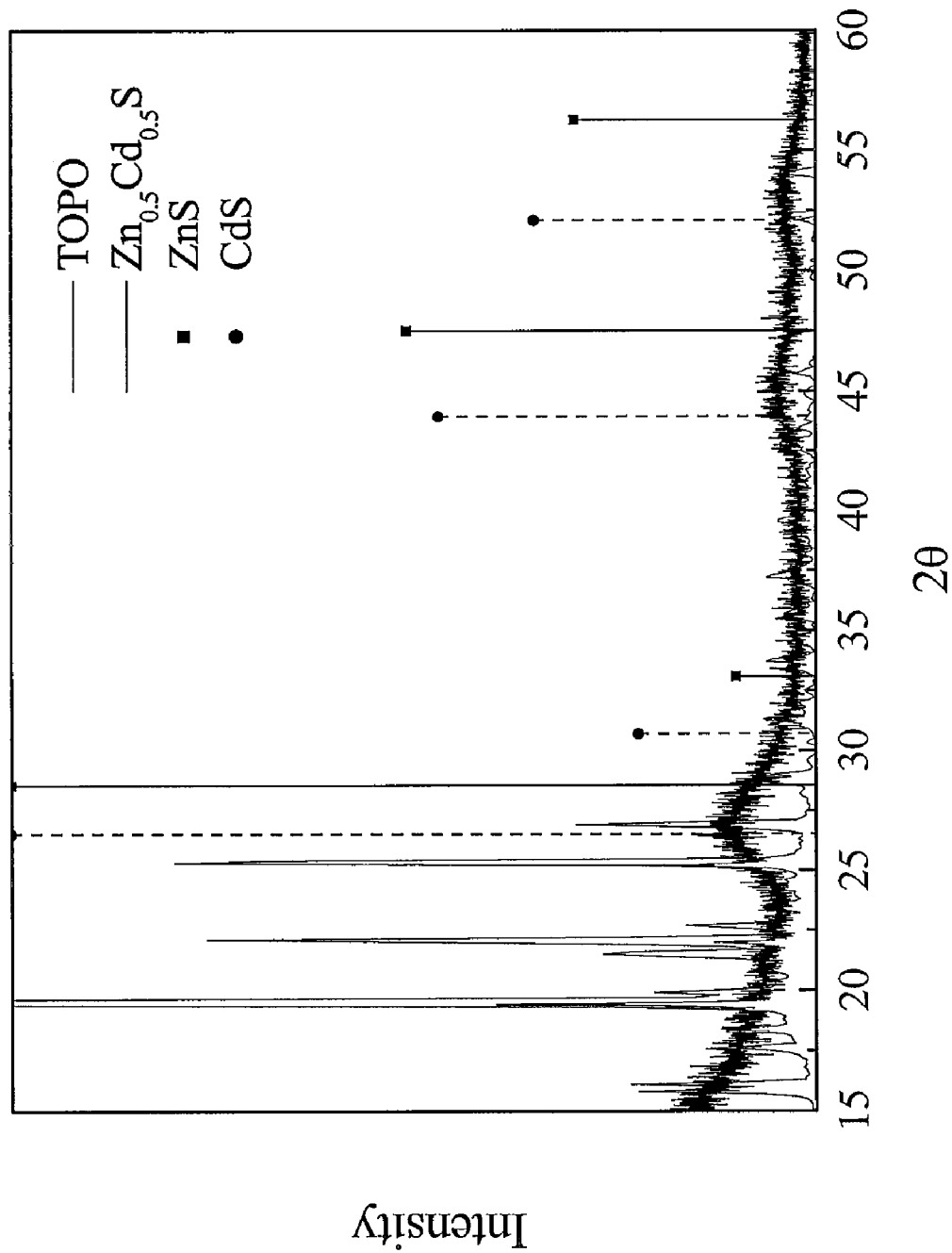
FIG. 9 is a XRD analysis of $Zn_{0.5}Cd_{0.5}S$ quantum dot of example 2.

FIG. 9 is an XRD analysis of the product sample. This XRD analysis shows that the product sample had a diffraction peak between that of pure ZnS and CdS. Accordingly, the formation of the product sample is an alloy between ZnS and CdS. Moreover, a diffraction peak of TOPO shown in the XRD analysis represents that TOPO organic molecule was bonded to the surface of the product sample and further wraps around it.

Figure 10:
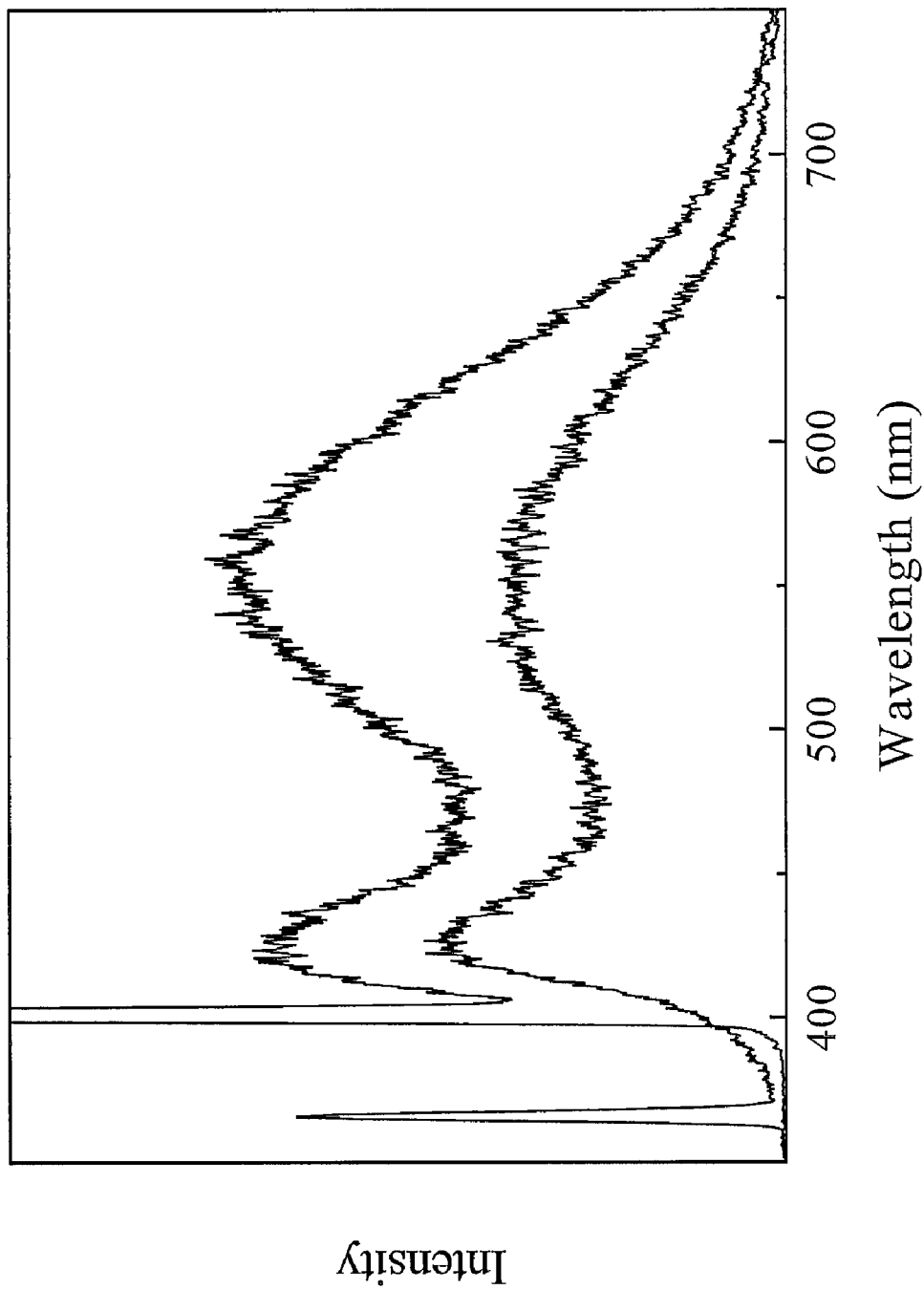
FIG. 10 is a PL spectrum of $Zn_{0.5}Cd_{0.5}S$ of example 2.

FIG. 10 is a photoluminescence spectrum of the product sample excited by light with wavelengths of 365 nm and 400 nm. Referring to FIG. 10, the product sample can emit a photoluminescence spectrum from 400 nm to 800 nm, as white light. Accordingly, quantum dot capable of emitting white light was prepared by the method in example 2.

In summary, $Zn_{0.5}Cd_{0.5}S$ quantum dot, prepared by the method in example 2, is wrapped by an organic molecule to prevent it from oxidation and can emit white light.

Example 3

$Zn_{0.9}Cd_{0.1}S$ Quantum Dot $Zn_{0.9}Cd_{0.1}S$ Preparation and Identification $Zn_{0.9}Cd_{0.1}S$ quantum dot was prepared by the method according to Example 1 with a modified mole ratio to reactants. Compared with the above examples, the reaction time of the sulfur-containing organic solution (A solution) and the homogeneous solution (B solution) was about 30 minutes. Specifically, in example 3, the sulfur-containing organic solution reacted with the homogeneous solution at a temperature of about 290° C. for about 30 minutes to prepare the $Zn_{0.9}Cd_{0.1}S$ quantum dot.

Figure 11:
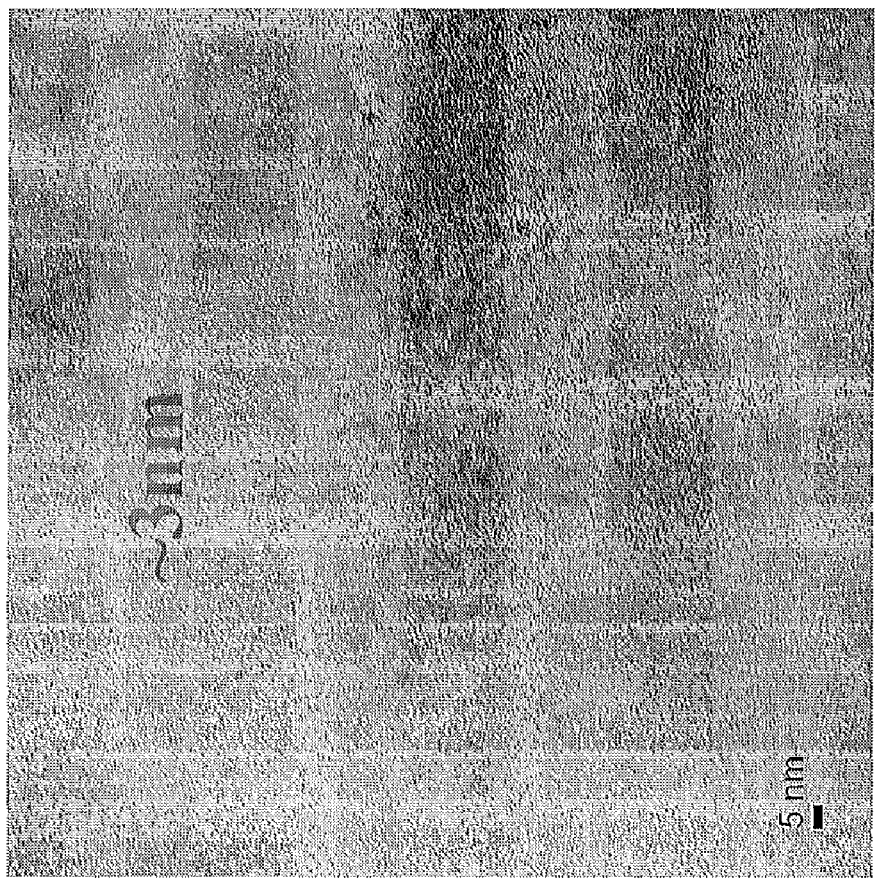
FIG. 11 is a TEM picture of $Zn_{0.9}Cd_{0.1}S$ quantum dot of example 3.

After preparation, the product sample was identified by transmission electron microcopy (TEM) and photoluminescence (PL) spectrum. The result was disclosed as following:

FIG. 11 is a TEM picture of the product sample. This TEM picture shows that the product sample, prepared by Example 3, had a diameter less than 5 nm and uniform diameter distribution.

Figure 12:
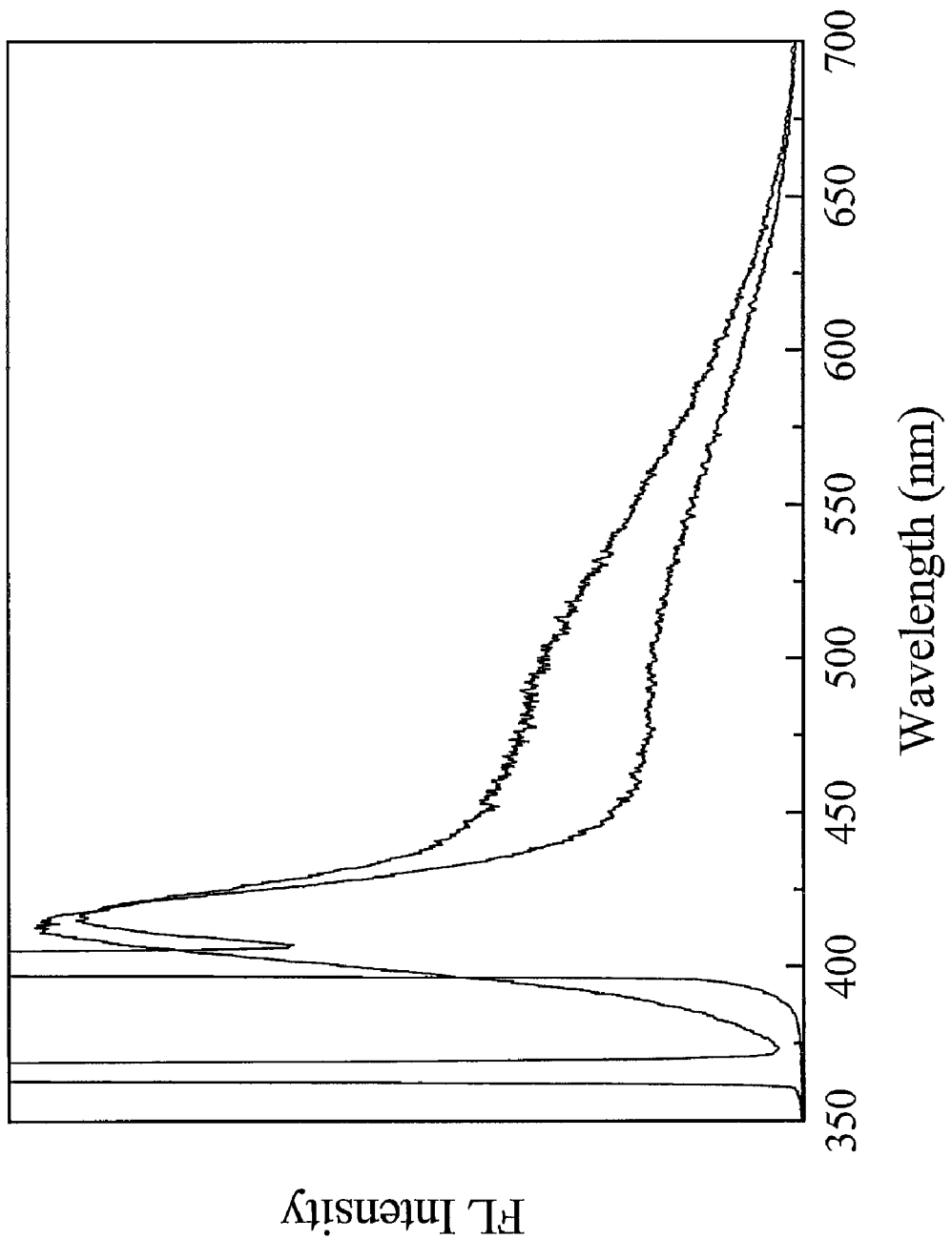
FIG. 12 is a PL spectrum of $Zn_{0.9}Cd_{0.1}S$ quantum dot of example 3.

FIG. 12 is a photoluminescence spectrum of the product sample excited by light with wavelengths of 365 nm and 400 nm. It was found that the product sample can emit white light with a photoluminescence spectrum from 400 nm to 800 nm. Thus, $Zn_{0.9}Cd_{0.1}S$ quantum dot, prepared by the method according to example 3, emits white light.

In summary, $Zn_{0.9}Cd_{0.1}S$ quantum dot, prepared by the method according to example 3, can emit white light with photoluminescence spectrum from 400 nm and 800 nm and is wrapped by an organic molecule.

Example 4

$Zn_{0.7}Cd_{0.3}S$ Quantum Dot $Zn_{0.7}Cd_{0.3}S$ Preparation and Identification The preparation steps were executed with a modified mole ratio to the reactants to prepare $Zn_{0.7}Cd_{0.3}S$ quantum dot according to example 4. In example 4, $Zn_{0.7}Cd_{0.3}S$ quantum dot was prepared with various reaction times.

In an experimental example of 5 minutes reaction time, the sulfur-containing solution (A solution) reacted with the homogeneous solution (B solution) at a temperature of about 290° C. for 5 minutes to obtain $Zn_{0.7}Cd_{0.3}S$ quantum dot of a first experimental example (hereinafter referred as "$Zn_{0.7}Cd_{0.3}S$-5 quantum dot"). In an experimental example of 10 minutes reaction time, A solution reacted with B solution at about 290° C. for 10 minutes to obtain $Zn_{0.7}Cd_{0.3}S$ quantum dot of a second experimental example (hereinafter referred as "$Zn_{0.7}Cd_{0.3}S$-10 quantum dot").

Figure 13:
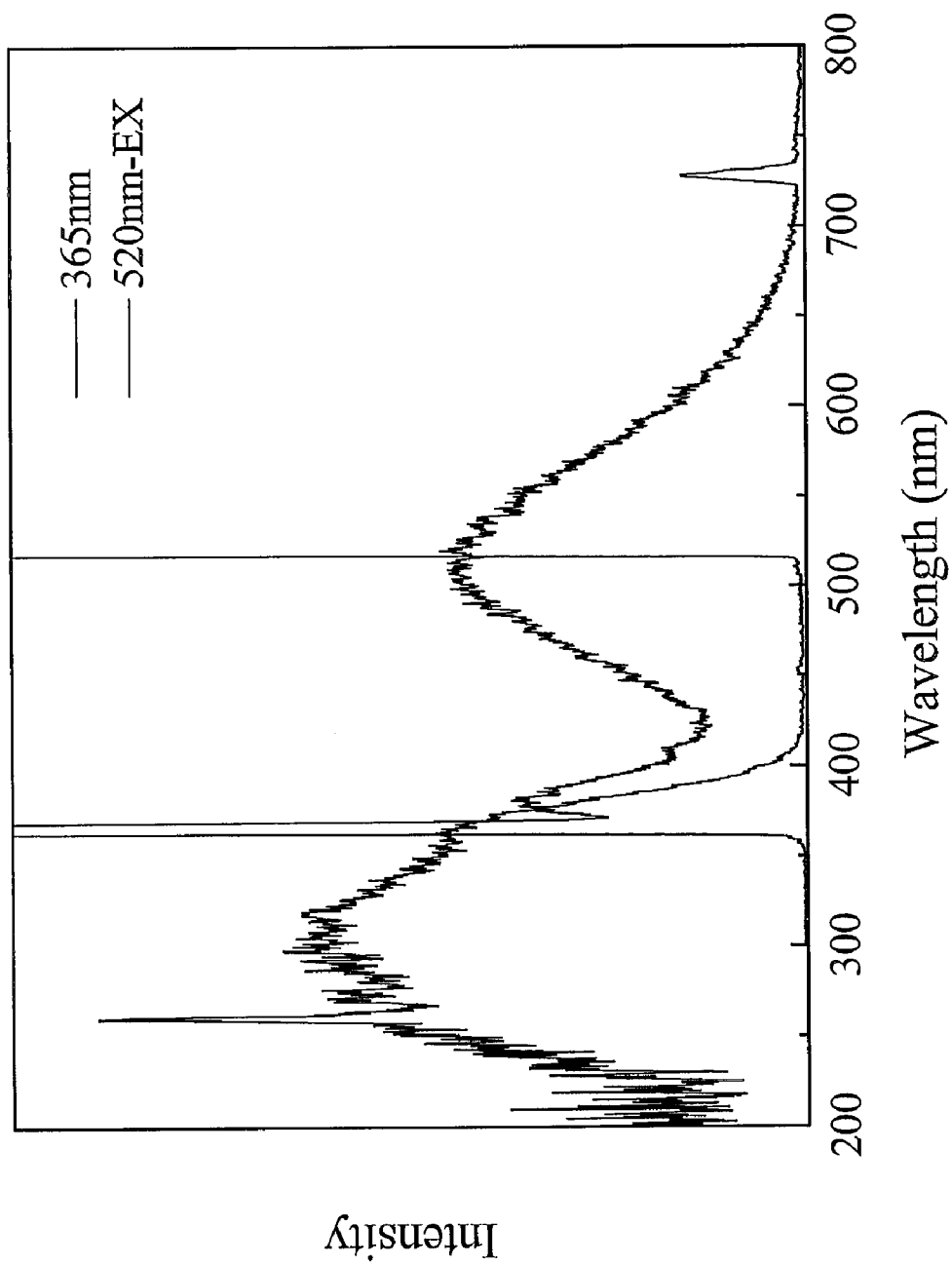
FIGS. 13-14 are PL spectrums of $Zn_{0.7}Cd_{0.3}S$ quantum dot prepared by various reaction times according to example 4.
Figure 14:
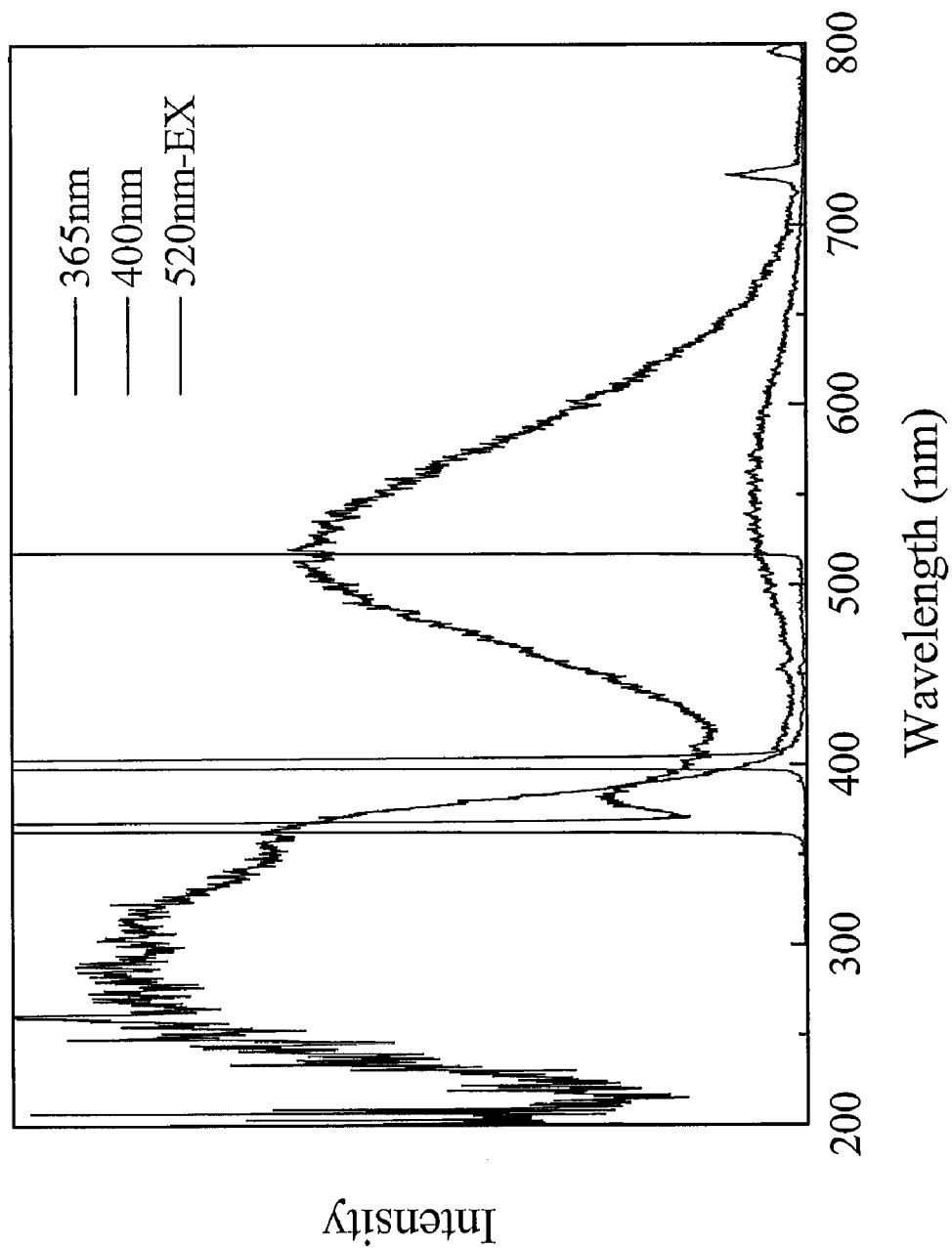

FIG. 13 is a photoluminescence spectrum of the first experimental example, $Zn_{0.7}Cd_{0.3}S$-5 quantum dot, excited by light with wavelength of 365 nm. FIG. 13 shows that $Zn_{0.7}Cd_{0.3}S$-5 quantum dot emits white light with a photoluminescence spectrum from 400 nm to 800 nm. FIG. 14 is a photoluminescence spectrum of the second experimental example, $Zn_{0.7}Cd_{0.3}S$-10 quantum dot, excited by light with wavelengths of 365 nm and 400 nm. FIG. 14 shows that $Zn_{0.7}Cd_{0.3}S$-10 quantum dot emits white light with a photoluminescence spectrum from 400 nm to 800 nm.

Accordingly, $Zn_{0.7}Cd_{0.3}S$ quantum dot, prepared by Example 4, emits white light with a photoluminescence spectrum from 400 nm to 800 nm.

Example 5

$Zn_{0.6}Cd_{0.4}S$ Quantum Dot $Zn_{0.6}Cd_{0.4}S$ Preparation and Identification The product sample was prepared by the method described in example 1 with a modified mole ratio to the reactants. Moreover, in example 5, $Zn_{0.6}Cd_{0.4}S$ quantum dot was prepared with various reaction times.

Figure 15:
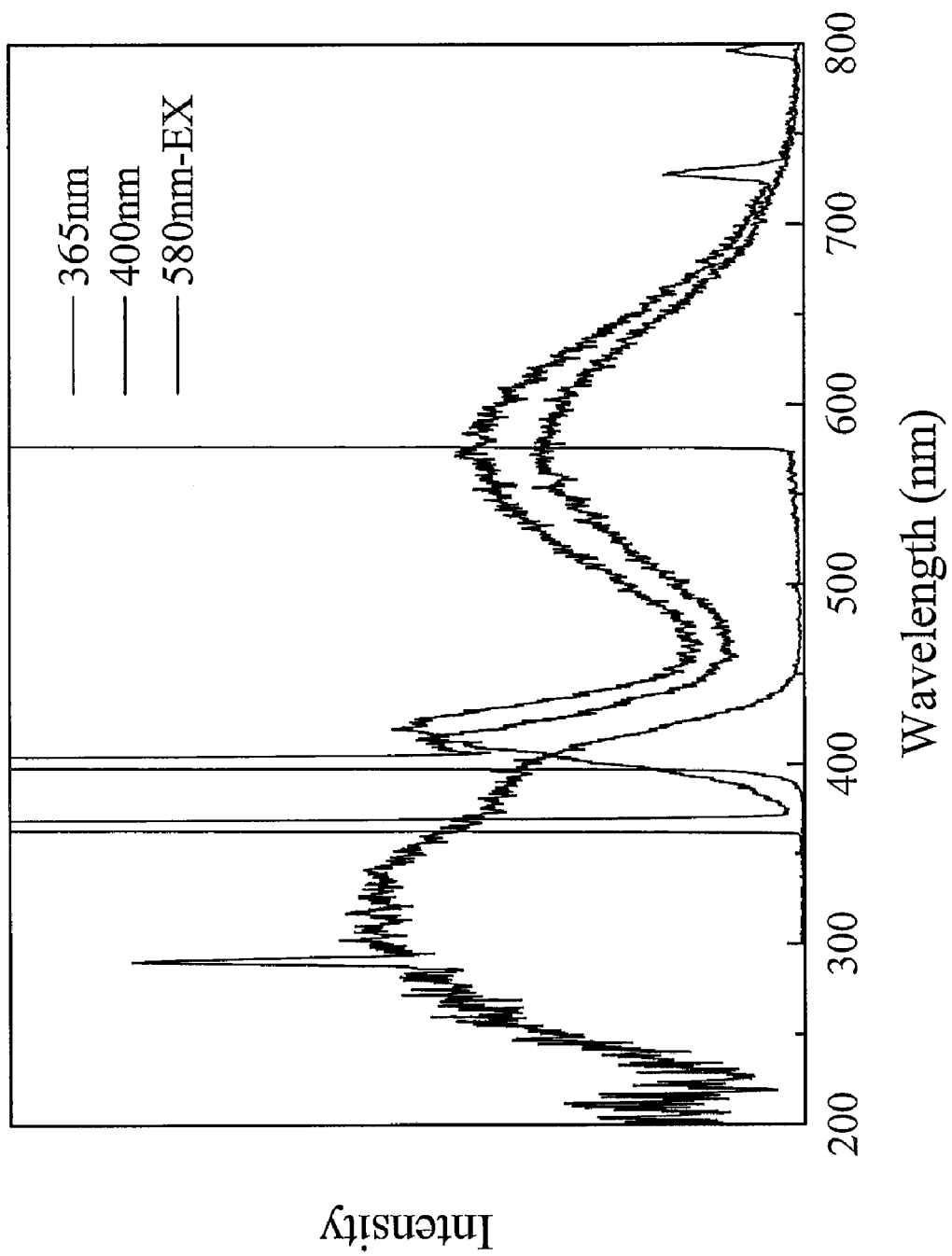
FIGS. 15-16 are PL spectrums of $Zn_{0.6}Cd_{0.4}S$ quantum dot prepared by various reaction times according to example 5.
Figure 16:
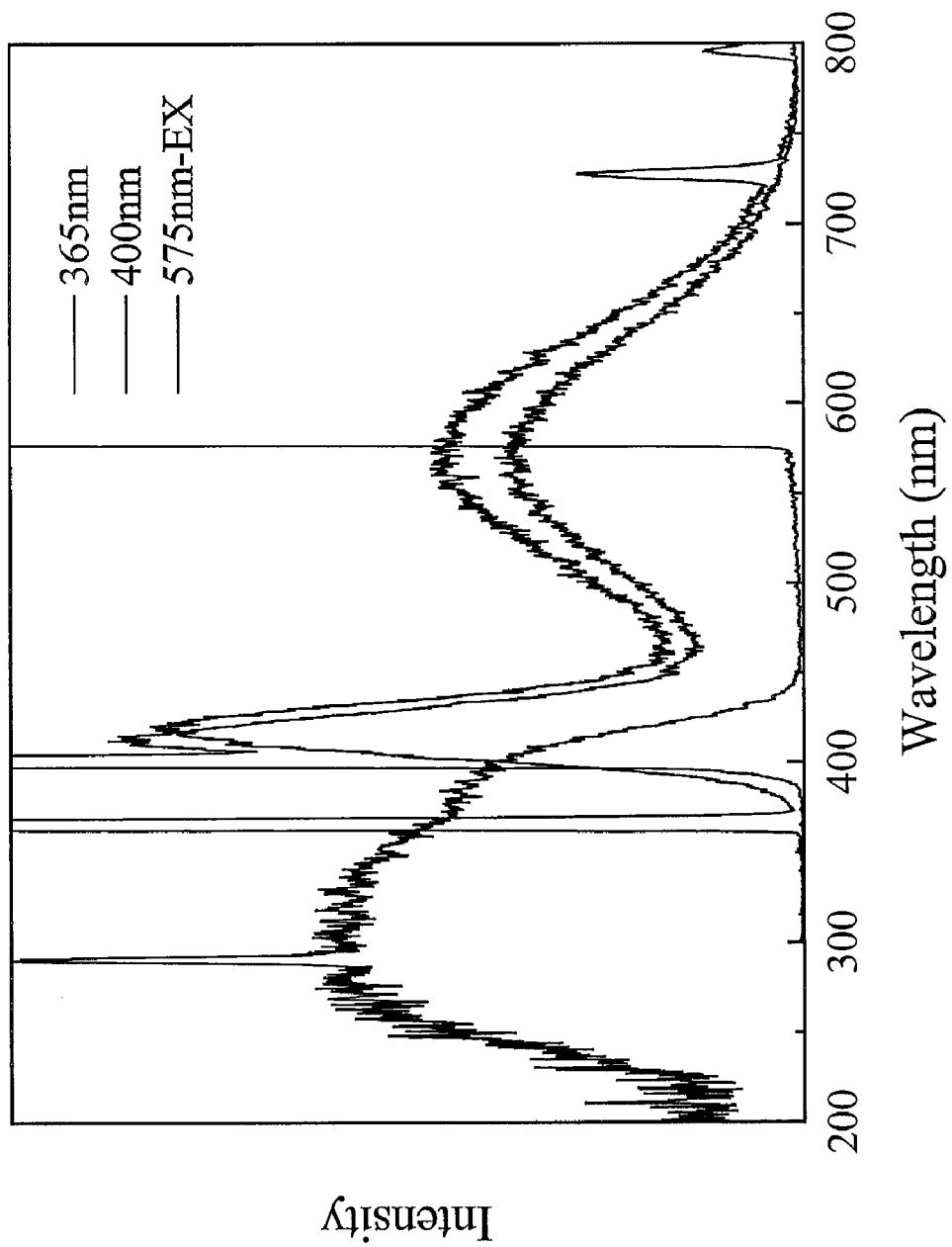

Similar to example 4, example 5 includes the experimental examples of 5 and 10 minute reaction times. FIG. 15 is a PL spectrum of a first experimental example, $Zn_{0.6}Cd_{0.4}S$ quantum dot with reaction time of 5 minutes (hereinafter referred as "$Zn_{0.6}Cd_{0.4}S$-5 quantum dot"), excited by light with wavelengths of 365 nm and 400 nm. Referring to FIG. 15, it was found that $Zn_{0.6}Cd_{0.4}S$-5 quantum dot emitted a photoluminescence spectrum from 400 nm to 800 nm, covering blue light, green light and yellow light, white light. FIG. 16 is a photoluminescence spectrum of a second first experimental example, $Zn_{0.6}Cd_{0.4}S$ quantum dot with reaction time of 10 minutes (hereinafter referred as "$Zn_{0.6}Cd_{0.4}S$-10 quantum dot"), excited by light with wavelengths of 365 nm and 400 nm. $Zn_{0.6}Cd_{0.4}S$-10 quantum dot can emit white light with a photoluminescence from 400 nm to 800 nm.

$Zn_{1-x}Cd_xS$ (0<x<1) quantum dot according to the examples of the invention can emit a visible light with a photoluminescence spectrum from 400 nm to 800 nm, and has a diameter of less than 10 nm. Moreover, an organic molecule is bonded to the surface of $Zn_{1-x}Cd_xS$ quantum dot and wraps around it to protect it from oxidation and allow it to be easily dispersed in an organic solvent. Furthermore, since there is one synthetic step in the preparation method, meaning that A solution reacted with B solution, thus, the preparation method is simple and costs are reduced.

Because $Zn_{1-x}Cd_xS$ quantum dot can be excited by light with a wavelength of less than or equal to 450 nm (like UV light) to emit a wide photoluminescence spectrum, $Zn_{1-x}Cd_xS$ quantum dot can replace phosphors used in conventional white light-emitting diode (LED).

Example 6

$Zn_{0.8}Cd_{0.2}S_{0.9}Se_{0.1}$ Quantum Dot $Zn_{0.8}Cd_{0.2}S_{0.9}Se_{0.1}$ Preparation and Identification A nanocrystal of quarternary alloy was prepared by the similar method described in example 1. Compared with the above examples, the difference was preparation of A solution.

0.0433 g sulfur powder in which moisture had been removed was added to 4 ml organic solvent such as octadecene and then the mixture was treated by an ultrasonic shocking at 80° C. to prepare a sulfur-containing organic solution such as sulfur-containing octadecene. 0.0118 g selenium (Se) powder in which moisture had been removed was added to an organic solvent of 0.2 ml tri-n-octylphosphine (TOP) and 0.8 ml n-hexane, and then performed ultrasonic shocking to obtain a selenium-containing organic solution. The sulfur-containing organic solution was mixed with the selenium-containing organic solution to obtain a sulfur- and selenium-containing organic solution (A solution).

A homogeneous solution (B solution), having the similar mole ratio to that in Example 1, was prepared and then heated up to 320° C. A solution was added to and reacted with B solution at a temperature of about 290° C. for about 10 minutes to prepare $Zn_{0.8}Cd_{0.2}S_{0.9}Se_{0.1}$ quantum dot.

It is appreciated that the reactants in this example may be in place of the reactants described in example 1. Moreover, A solution with modified mole ratio of sulfur to selenium may react with B solution described in the above examples to prepare a quarternary alloy with various mole ratios, as quantum dot.

Figure 17:
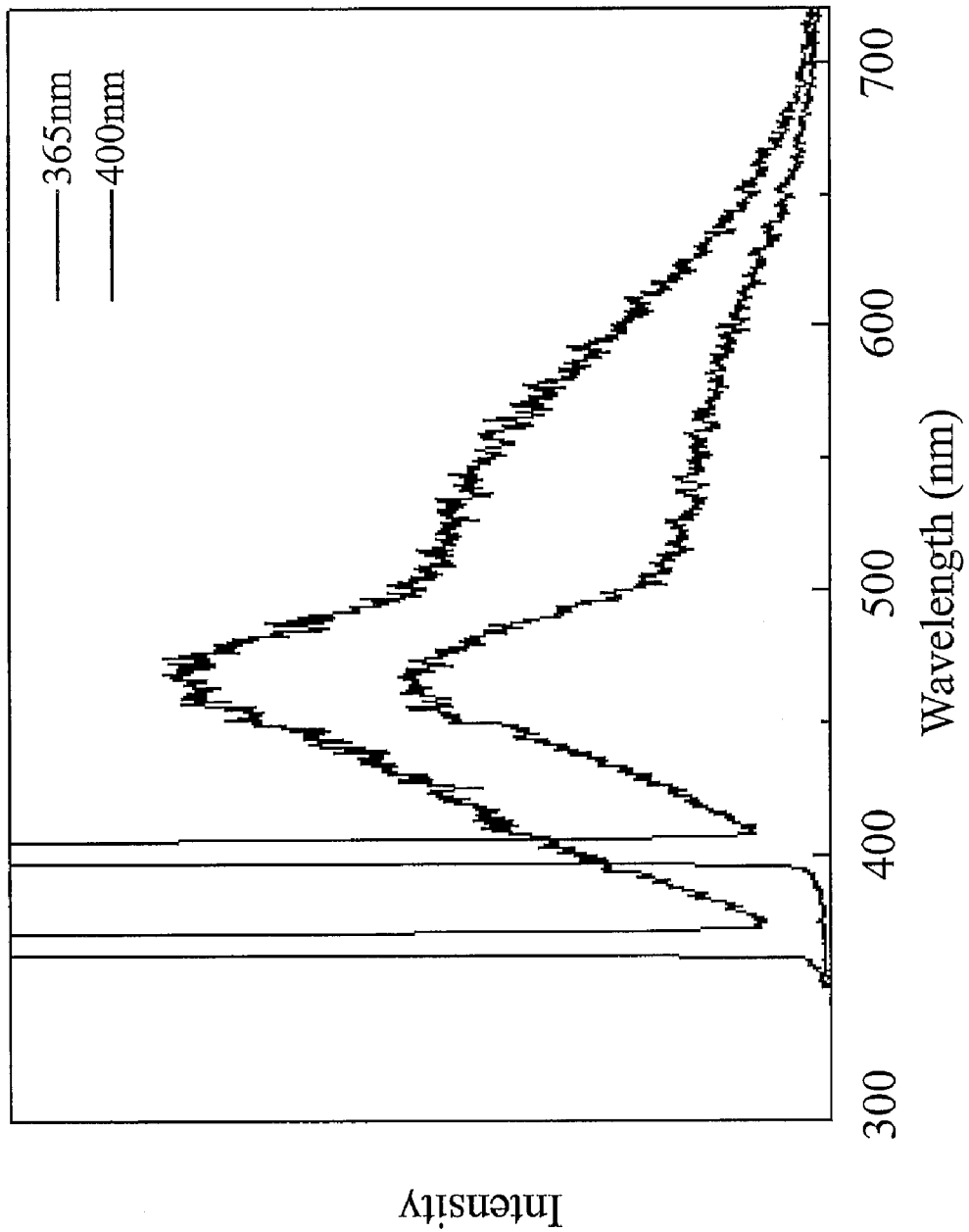
FIG. 17 is a PL spectrum of $Zn_{0.8}Cd_{0.2}S_{0.9}Se_{0.1}$ quantum dot of example 6.

FIG. 17 is a photoluminescence spectrum of the product sample, $Zn_{0.8}Cd_{0.2}S_{0.9}Se_{0.1}$ quantum dot, excited by light with wavelengths of 365 nm and 400 nm. Referring to FIG. 17, the product sample can emit white light with a photoluminescence spectrum from 400 nm to 700 nm.

Accordingly, the quarternary alloy quantum dot, prepared by this example, has a formula: $Zn_{1-x}Cd_xS_{1-y}Se_y$; 0<x<1 and 0<y<1. Moreover, $Zn_{1-x}Cd_xS_{1-y}Se_y$ quantum dot can emit white light with photoluminescence spectrum from 400 nm to 700 nm while it is excited by light with wavelengths of 365 nm or 400 nm.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A preparation method of $Zn_xCd_{1-x}A$ quantum dot, wherein A is S or $S_{1-y}Se_y$, 0<X<1, 0<y<1, comprising:
   preparing a sulfur-containing organic solution;
   mixing a cadmium-containing precursor and a zinc-containing precursor with an organic acid to form a complex compound and dissolving the complex compound in a co-solvent to obtain a homogeneous solution, wherein the co-solvent comprises aliphatic phosphines and organic amines; and
   mixing the sulfur-containing organic solution with the homogeneous solution to produce $Zn_xCd_{1-x}A$ quantum dot.

2. The method as claimed in claim 1, wherein the sulfur-containing organic solution is prepared by dissolving a sulfur powder in an organic solvent comprising octadecene, tri-n-octylphosphine (TOP), tri-n-butylphosphine (TBP) or dioctylamine (DOA).

3. The method as claimed in claim 2, wherein preparing the sulfur-containing organic solution comprises an ultrasonic shocking treatment at a temperature of between 40° C. and 80° C. for 20 minutes to 40 minutes.

4. The method as claimed in claim 1, wherein the sulfur-containing organic solution comprises sulfur-containing octadecene solution, sulfur-containing tri-n-octylphosphine solution, sulfur-containing tri-n-butylphosphine or sulfur-containing dioctylamine solution.

5. The method as claimed in claim 1, wherein the cadmium-containing precursor comprises cadmium oxide (OdO), cadmium acetate $(Cd(CH_3COO)_2)$ or dimethyl cadmium $(Cd(CH_3)_2)$.

6. The method as claimed in claim 1, wherein the zinc-containing precursor comprises zinc oxide (ZnO), zinc acetate $(Zn(CH_3COO)_2)$, zinc stearate $(Zn(C_{18}H_{35}COO)_2)$ or diethyl zinc $(Zn(C_{18}H_{35}COO)_2)$.

7. The method as claimed in claim 1, wherein the organic acid comprises aliphatic acids.

8. The method as claimed in claim 1, wherein the organic acid comprises stearic acid, lauric acid or oleic acid.

9. The method as claimed in claim 1, wherein the aliphatic phosphines comprise tri-n-octylphosphine oxide (TOPO).

10. The method as claimed in claim 1, wherein the organic amines comprise dodecylamine (DDA) or hexadecylamine (HAD).

11. The method as claimed in claim 1, wherein preparing the homogeneous solution further comprises a stirring step.

12. The method as claimed in claim 1, wherein the sulfur-containing organic solution is mixed and reacted with the homogeneous solution at a temperature of between 250° C. and 350° C.

13. The method as claimed in claim 1, wherein the sulfur-containing organic solution is mixed and reacted with the homogeneous solution for 1 second to 120 minutes.

14. The method as claimed in claim 1, wherein the $Zn_xCd_{1-x}A$ quantum dot has a diameter less than 10 nm.

15. The method as claimed in claim 1, wherein the $Zn_xCd_{1-x}A$ quantum dot is excited by light with a wavelength of less than or equal to 450 nm to emit a photoluminescence spectrum from 400 nm to 800 nm.

16. The method as claimed in claim 1, wherein A is $S_{1-y}Se_y$ (0<y<1) and the method before mixing the sulfur-containing organic solution with the homogeneous solution, further comprises:

mixing the sulfur-containing organic solution with a selenium-containing organic solution to form a sulfur- and selenium-containing organic solution; and mixing the sulfur- and selenium-containing organic solution with the homogeneous solution to produce the $Zn_xCd_{1-x}A$ quantum dot.

17. The method as claim in claim 16, wherein the selenium-containing organic solution is prepared by dissolving a selenium powder in an organic solvent comprising tri-n-octylphosphine and n-hexane.

18. The method as claimed in claim 17, wherein preparing the selenium-containing organic solution further comprises an ultrasonic shocking treatment at room temperature.

19. The method as claimed in claim 16, wherein the sulfur- and selenium-containing organic solution is mixed and reacted with the homogeneous solution at a temperature of between 250° C. and 350° C.

* * * * *